Feb. 18, 1936. E. G. POWELL 2,031,502
ELECTRICAL CONTROLLER
Filed Sept. 28, 1933 4 Sheets-Sheet 1
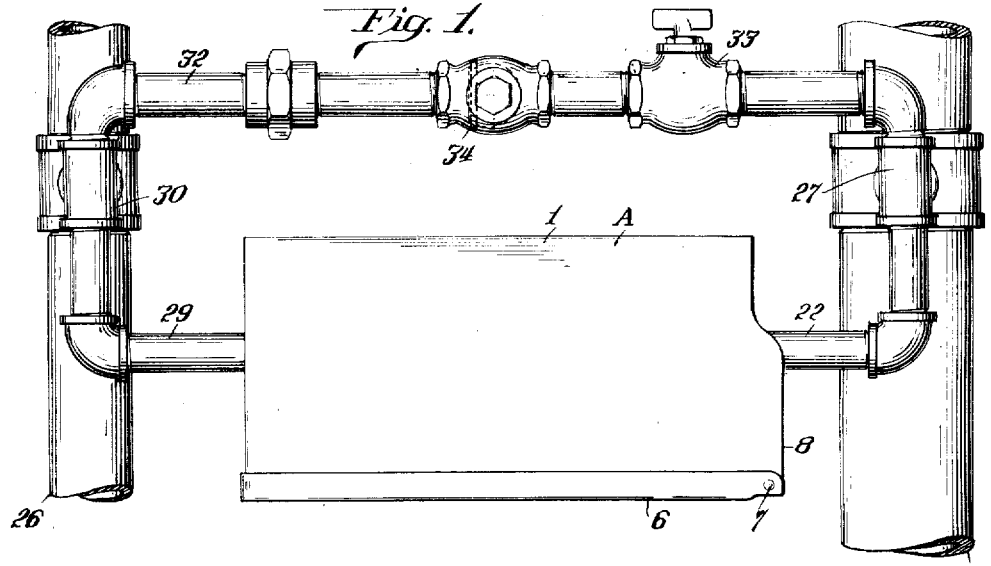
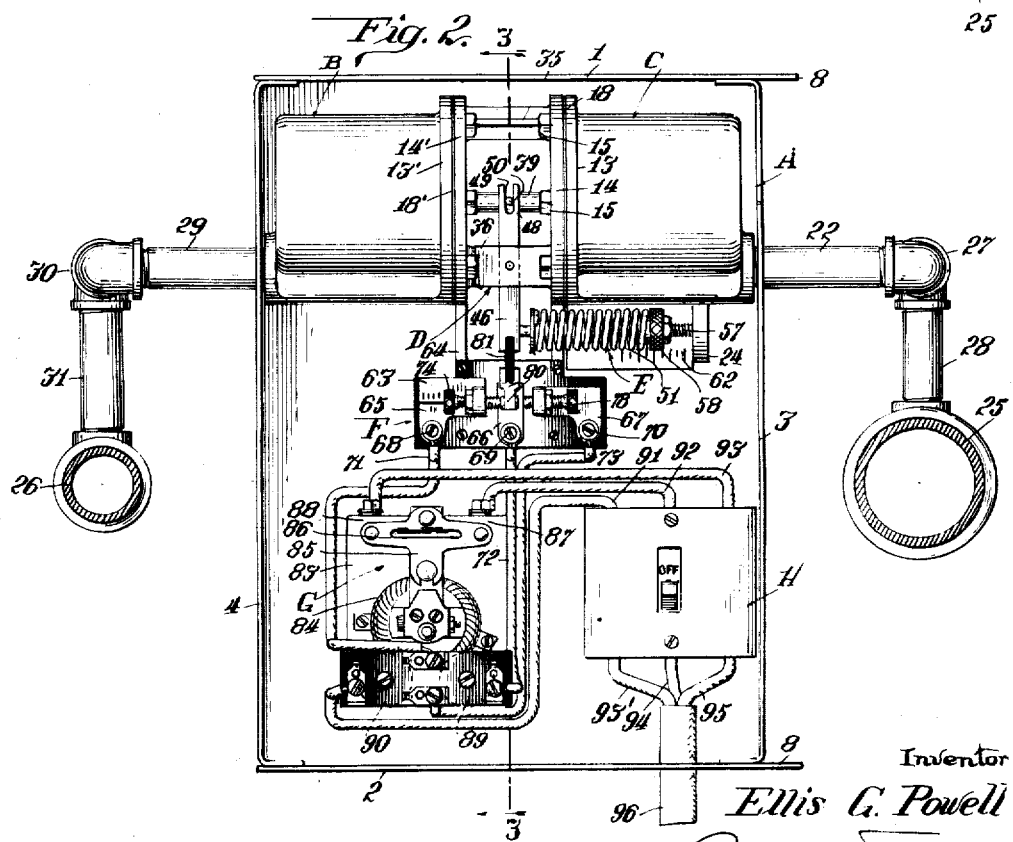
Inventor
Ellis G. Powell
By Barnett & Truman
Attorneys

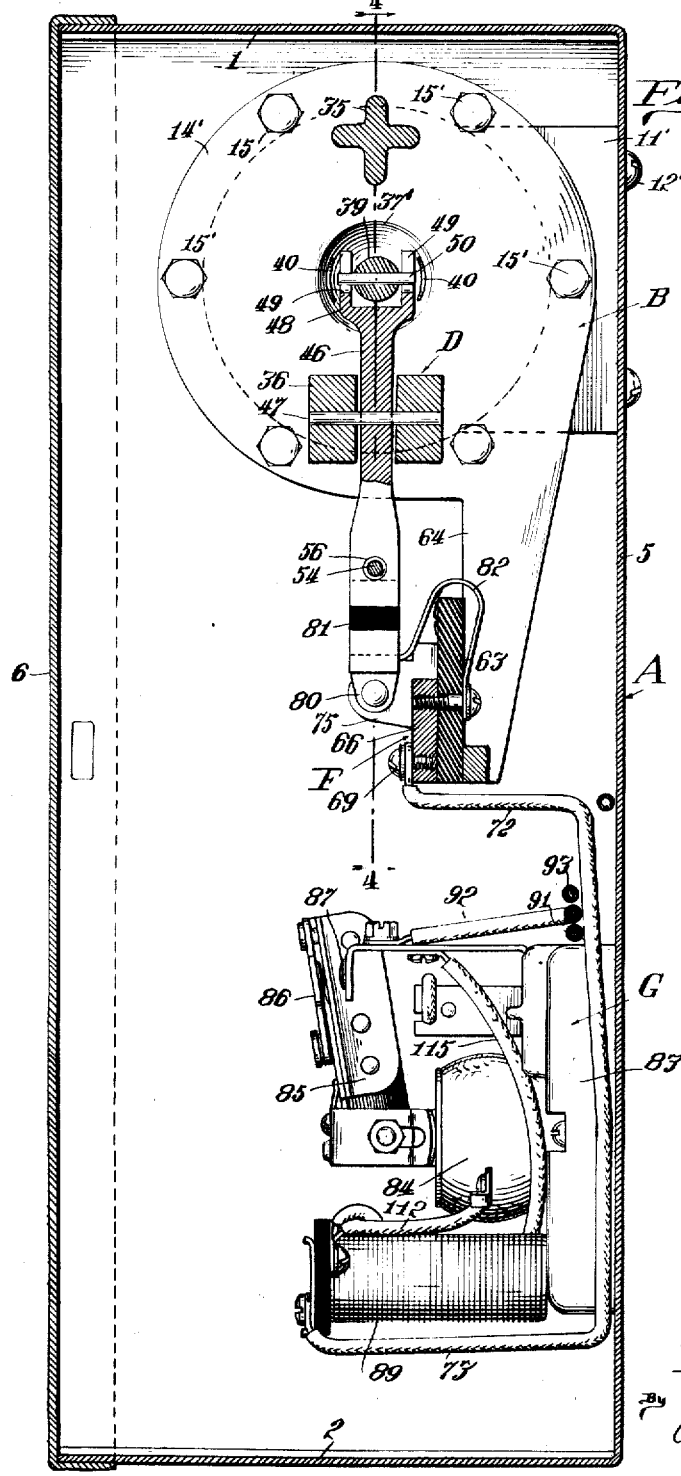

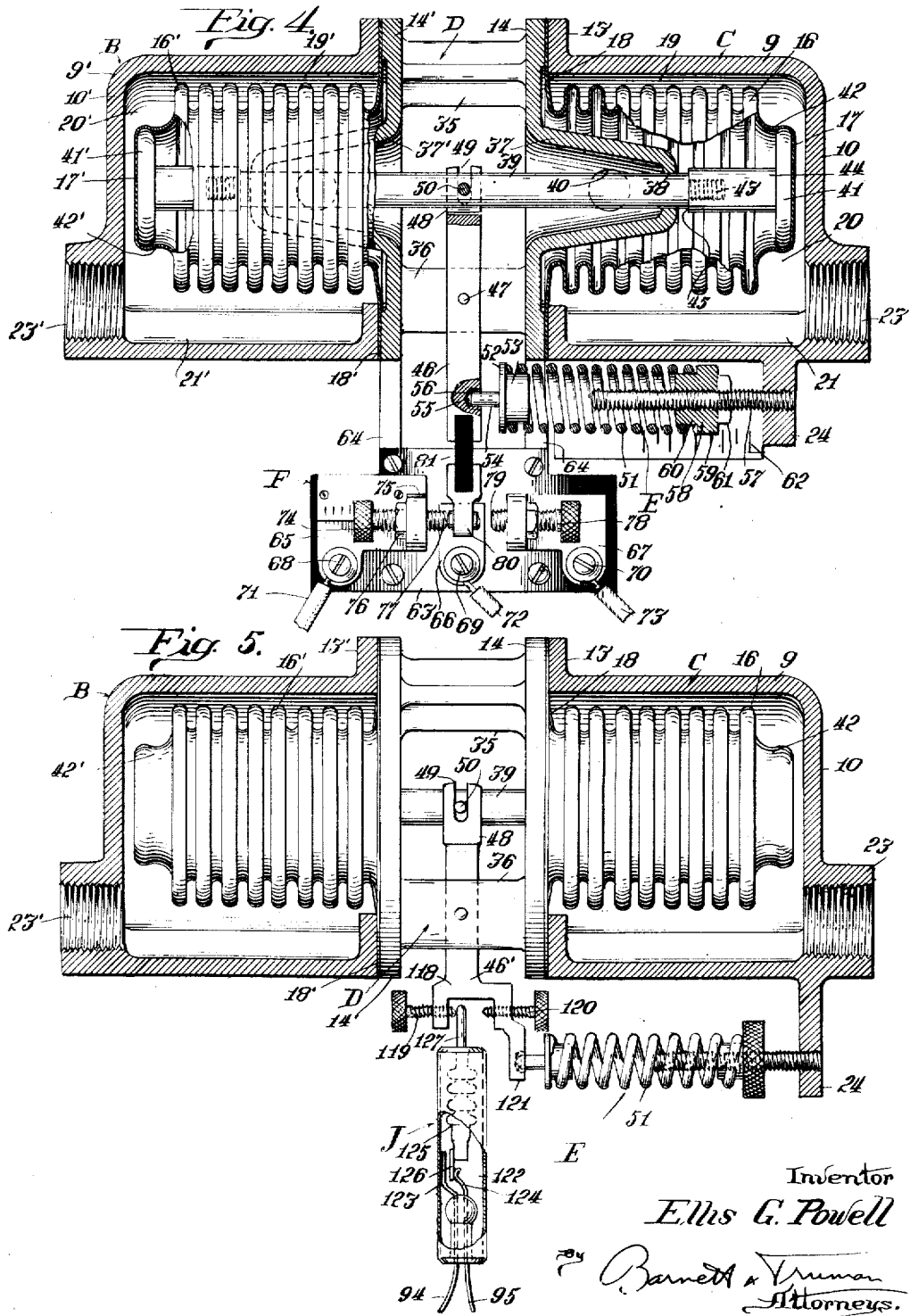

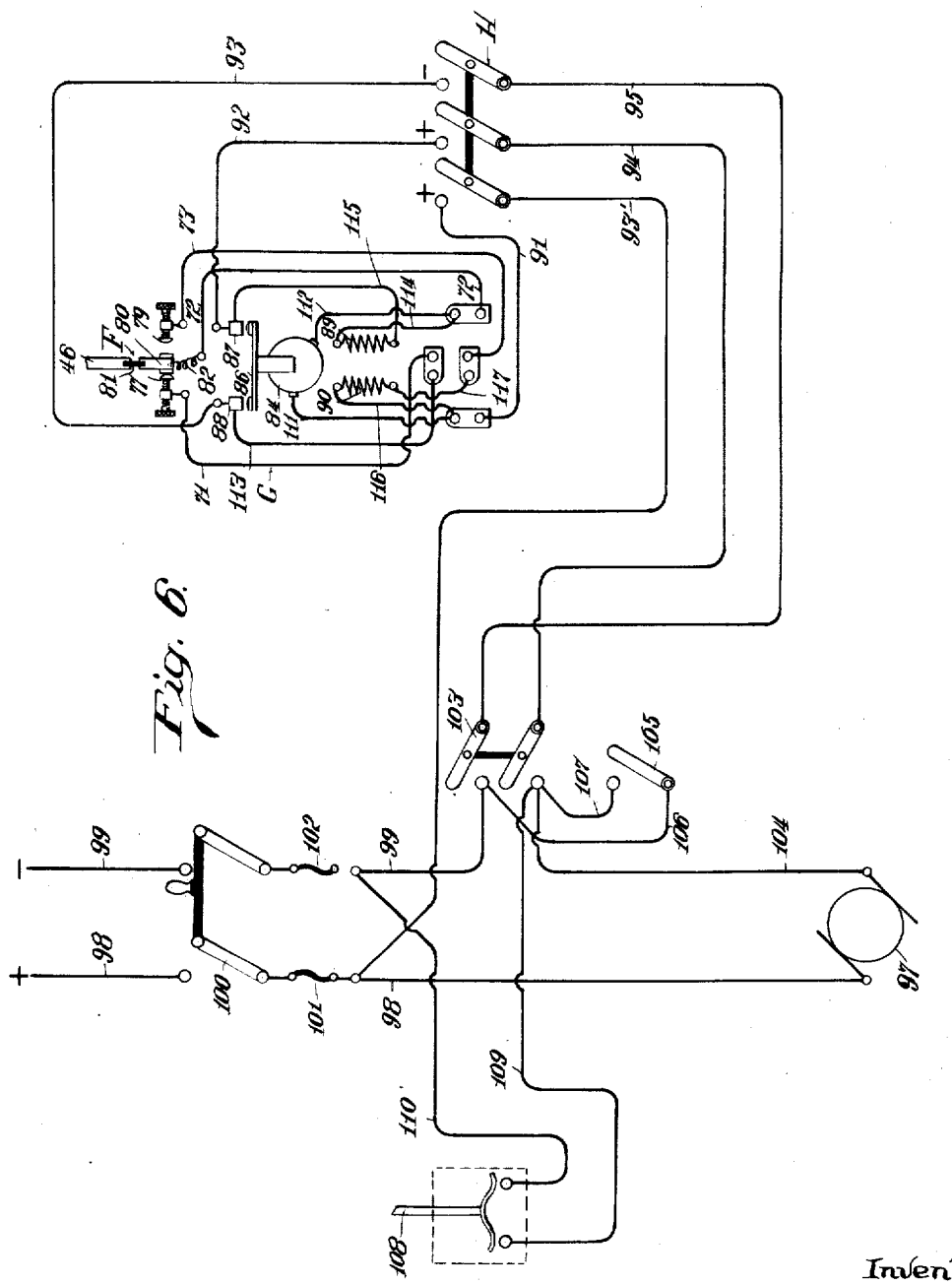

Patented Feb. 18, 1936

2,031,502

UNITED STATES PATENT OFFICE 2,031,502

ELECTRICAL CONTROLLER

Ellis G. Powell, Michigan City, Ind., assignor to C. A. Dunham Company, Marshalltown, Iowa, a corporation of Iowa Application September 28, 1933, Serial No. 691,304

9 Claims. (Cl. 200—83)

This invention relates to certain new and useful improvements in an electrical controller, and more particularly to an improved pressure-operated device for making and breaking an electric circuit, or a plurality of circuits, the device embodying a pressure operated circuit-breaker capable of fine adjustment and requiring a minimum of power for its operation, the circuit breaker in turn controlling an electrically actuated relay which opens and closes the main circuit or circuits to be controlled.

While this improved electrical controller may be adapted for a multiplicity of uses, as will be hereinafter apparent, it has been designed especially for use in a heating system of the differential vacuum type in which a predetermined substantially constant pressure difference is to be maintained between two different portions of the piping system. For example, a certain pressure (usually subatmospheric) is maintained within the radiators in accordance with the heat output desired therefrom, and the pressure within the return pipe is maintained lower by a predetermined difference so as to assure the evacuation of non-condensable gases and condensate from the radiators when the steam traps open. A heating system of this type is disclosed and claimed in the patent to Dunham, 1,644,114, granted October 4, 1927. In order to maintain this pressure differential, an exhausting apparatus connected with the return pipe of the heating system is put into or out of operation intermittently, the electrical operating circuit for actuating the exhauster being completed when the pressure differential falls below a predetermined minimum, and the circuit being broken when this pressure differential rises above a predetermined maximum. The controllers usually employed for automatically effecting this operation of the exhausting mechanism include a pair of opposed pressure chambers connected respectively with the supply and return sides of the heating system, the chambers being separated by a diaphragm or a plurality of diaphragms which are warped in one direction or the other in accordance with the difference in pressure existing between the two chambers. This movement of the diaphragm or diaphragms is employed to furnish the power which actuates a snap-switch mechanism for making and breaking the operating circuit for the exhauster. This type of controller is open to the disadvantage that it is cumbersome, comparatively inconvenient to install, and is not capable of close range adjustment. The diaphragms must be made of excessive size to provide sufficient energy to operate the quick make and break switch mechanism, and even when made of sufficient size the desired sensitiveness of operation is not available owing to the lost motion that is necessary in order to operate the snap switch.

Briefly described, the present improved controller embodies a pair of opposed pressure chambers which are comparatively small and which are completely closed, thus requiring no packings about moving parts. The relative movement of the two diaphragms, caused by changes in the pressure differential, operates the movable contact member of a circuit breaker which makes and breaks the control circuit for an electrically actuated relay which in turn controls the main actuating circuit for the exhausting mechanism. The contacts of the circuit breaker may be accurately adjusted so as to determine the range or sensitiveness of the instrument, that is the variations in either direction that are permitted from the predetermined pressure differential. Means is also provided for accurately determining the pressure differential to be maintained.

The principal object of this invention is to provide an improved electrical controller of the type briefly described hereinabove and disclosed more in detail in the specifications which follow.

Another object is to provide an improved differential pressure controller which enables a quick make and break operation to be obtained from a minimum of energy supplied from the pressure-operated mechanism.

Another object is to provide an improved differential pressure controller which can be readily adjusted for either high or low differentials, and in which the range of variation from the predetermined differential can be very accurately adjusted within small limits.

Another object is to provide, in a controller of this type, a self-draining pressure-operated bellows mechanism.

Another object is to provide, in a mechanism of this type, a pair of cooperating opposed bellows mechanisms connected by an interposed stem which need not be rigidly connected with the respective bellows in order to transmit the power derived therefrom.

Another object is to provide such a bellows mechanism requiring a minimum of expansion and contraction movements and provided with stops to limit this movement.

Another object is to provide an electrical controller of this type which is easy to install and capable of use with a variety of operating circuits.

Other objects and advantages of this invention will be more apparent from the following detailed description of certain approved forms of apparatus constructed and operating according to the principles of this invention.

In the accompanying drawings:

Fig. 1 is a top or plan view showing the controller as connected in the piping of a heating system.

Fig. 2 is a front elevation of the assembly shown in Fig. 1, the cover of the controller casing being removed to show the parts assembled therein.

Fig. 3 is a vertical section, on a larger scale, the view being taken substantially on the line 3—3 of Fig. 2.

Fig. 4 is a vertical section through the upper portion of the controller, the view being taken substantially on the line 4—4 of Fig. 3.

Fig. 5 is a view similar to Fig. 4 showing a modified form of circuit-breaker.

Fig. 6 is a wiring diagram showing the controller connected with one type of circuit to be controlled.

The controller comprises, in general, a casing A which supports and encloses the various portions of the device, a pair of similar pressure-operated units B and C, an interposed mechanism D actuated by the members B and C in response to variations in the pressure differences between these members, a balancing device E for offsetting the normal difference in pressure exerted by the members B and C, a circuit breaker F actuated by the mechanism D, a relay G controlled by the circuit breaker F, and a main switch H for cutting on or off the power connection to the controller.

The casing A comprises top and bottom walls 1 and 2, side walls 3 and 4, and a rear wall 5 to which the members B, C, G and H are attached, the devices F and E being suspended from the assembly consisting of members B, C and D. The front of the casing is normally closed by a door 6 hinged at 7 to flanges 8 extending at one side from the top and bottom plates 1 and 2.

The pressure-operated unit C comprises a casing 9 of generally hollow cylindrical form, closed at its outer end by the wall 10 and open at its inner end. This casing is supported by a bracket extension 11 secured at 12 to the rear wall 5 of casing A. An annular flange 13 is formed around the open inner end of the casing, the closure plate 14 which is formed as a portion of the intermediate spacing member D being secured to flange 13 by the bolts 15. The flexible diaphragm 16 is in the form of a corrugated metallic bellows which is closed at one end by the wall 17 and is provided at the other end with an outstanding annular flange 18 which is clamped between the flange 13 and the closure plate 14. The bellows is thus housed within the casing 9 and supported at one end by the flange 18. The inner end of the bellows is supported by the operating stem, as hereinafter described. A permanently closed pressure chamber is formed within casing 9, this chamber comprising the annular space 19 around the bellows 16, the space 20 between the inner end of the bellows and the outer wall 10 of the casing, and the well 21 which is formed in the lower portion of the casing as a downward extension of the cylindrical space within which the bellows is housed. This well 21 is for the purpose of collecting such condensate as may form within the pressure chamber. The pipe 22 which supplies the fluid under pressure to the pressure chamber is screwed into the nipple 23 formed in the lower portion of wall 10 so as to communicate with the well 21. This permits the condensate which collects in well 21 to drain out through pressure-pipe 22. The casing 9 of pressure-operated unit C is also provided with a downwardly projecting bracket 24 which supports one end of the balancing mechanism E hereinafter described. The other pressure-operated unit B is in all respects the same as the unit C just described except for the fact that the parts thereof are oppositely disposed, and this unit B is not provided with a bracket 24. The corresponding parts of unit B are indicated by primed reference characters.

Referring now more particularly to Figs. 1 and 2, at 25 is indicated a portion of the steam-supply pipe, or the pipe containing fluid under the higher pressure, and at 26 is indicated a portion of the return pipe, or the pipe containing fluids under the lower pressure. The pressure pipe 22 leads into a T-fitting 27 from which a pipe 28 leads downwardly into communication with high pressure pipe 25. In an exactly similar manner, pipe 29 leading from the unit B connects into a T-fitting 30 from which vertical pipe 31 leads downwardly into the low pressure pipe 26. This arrangement will permit any liquids which collect in the units B and C to drain out from the wells 21 and 21' through these pipe connections into the respective high and low pressure pipes.

As is usual in systems of this type, an equalizing pipe 32 may be connected between the two fittings 27 and 30, this pipe connection 32 including a normally open cut-off valve 33, and a one-way valve 34 which opens only towards the high pressure side of the system. No fluids will ordinarily pass through this pipe connection 32, but if for any reason the pressure in normally low pressure pipe 26 should rise above the pressure in the normally high pressure pipe 25 valve 34 will open to permit an equalizing of the pressures.

Referring now to Figs. 2, 3 and 4, the intermediate member D comprises the two closure plates 14 and 14', previously referred to, which are integrally connected by a plurality of spacing struts indicated at 35 and 36. A conical web 37 projects from closure plate 14 into the interior of bellows 16 and is formed at its outer end with a slide bearing 38 in which is mounted one end portion of the operating stem 39. A similar web 37' projects into bellows 16' and is formed with a slide bearing for supporting the other end portion of stem 39. A plurality of openings 40 are formed in the webs 37 and 37' so that the interior of the bellows diaphragms will always be under atmospheric pressure. A head member 41 abuts against the end wall 17 of bellows 16 and may be held in place thereagainst by an inturned portion 42 of the bellows structure. The adjacent end portion of stem 39 is threaded at 43 into a stud or stem 44 projecting inwardly from head 41. A similar head structure 41' is secured to the opposite end of stem 39 and engages the outer end of bellows diaphragm 16'.

It will now be apparent that the connecting stem 39 joins the two bellows diaphragms so that they will operate as a unit, and if the pressure in chamber 19 is higher than the pressure in chamber 19' there will be a tendency for the bellows 16 to contract or move toward the left and for the bellows 16' to expand and also move toward the left. It will be noted that the stud 44 is of greater diameter than stem 39 so as to provide a shoulder 45 at the inner end of the stud which will engage the end of web 37 to limit the compression of the bellows diaphragm 16. Also the end wall 17 of the bellows is positioned quite closely adjacent the end wall 10 of the casing 9 so as to limit the expansive movement of the bellows. In this manner the expansion and contraction of the bellows diaphragm is held within quite narrow limits so that the bellows structure cannot be excessively distended or compressed even though excessive pressure changes take place within the pressure chamber 19. As will be hereinafter apparent, a very small movement of the bellows diaphragm is sufficient to operate the circuit breaker F.

The operating lever 46 is intermediately pivoted between the struts 36 on pin 47. The upper forked end 48 of this lever is provided with slots 49 which engage about the opposite end portions of a pin 50 mounted in the central portion of stem 39. It will thus be apparent that longitudinal movements of the stem 39 will impart rocking movements to the lever 46.

The balancing device E comprises a compression spring 51 which engages at one end against the collar 52 of an abutment member formed on one side with a cylindrical centering lug 53 which projects within the end portion of spring 51, and formed on the other side with a stem 54 terminating in a conically pointed end portion 55 which has a rocking bearing within an opening 56 formed in one side of lever 46. A threaded stem 57 is fixed at one end within the bracket 24 projecting downwardly from casing 9. A knurled nut 58 threaded on stem 57 is formed with an outstanding collar 59 against which the opposite end of spring 51 abuts, and a cylindrical centering lug 60 which projects into the adjacent end portion of the spring. The nut 58 is held in adjusted position by lock nut 61.

Since normally a higher pressure will exist in unit C than in unit B, there will be a tendency for the bellows diaphragms to be moved toward the left thus causing a corresponding movement of stem 39 and consequently swinging the lower arm of lever 46 toward the right, or in a counter clockwise direction. On the other hand, the compressed spring 51 tends to swing lever 46 toward the left or in a clockwise direction. It will thus be seen that the spring 51 tends to offset or balance the force applied to lever 46 by the difference in pressure existing between the two pressure units C and B. The spring 51 should be adjusted so that the lever 46 will be held in a central or vertical position when the desired pressure differential exists between the high and low pressure chambers. For example, supposing it is desired to maintain a constant pressure difference of two pounds per square inch between the high and low pressure sides of the heating system, spring 51 will be so adjusted that when this pressure difference exists the spring will just offset the force applied to stem 39 by this pressure difference and the lever 46 will remain in a central or vertical position. By suitably adjusting the position of nut 58, the device can be adjusted to maintain any desired pressure differential (within suitable limits) between the high and low pressure systems to which the respective units C and B are connected. An index plate indicated at 62 and supported by bracket 24 may be calibrated to show the proper positioning of nut 58 in order to maintain the desired pressure differential.

The circuit breaker F comprises a supporting plate of insulating material 63 which is mounted on the bracket arms 64 projecting downwardly from spacing member D. On this supporting plate 63 are mounted three terminal plates 65, 66 and 67 provided respectively with binding posts 68, 69 and 70 to which the wires 71, 72 and 73 of certain control circuits are connected. A screw 74 is threaded in a bracket arm 75 formed on terminal plate 65, the screw being held in adjusted position by lock nut 76. The inner end 77 of screw 74 forms one adjustably fixed contact of the circuit breaker. A similar screw 78, adjustably mounted in the same manner in terminal plate 67, forms at its inner end the second fixed contact 79 of the circuit breaker. A movable contact member 80 is supported by a bar of insulating material 81 on the lower end of lever 46, this movable contact 80 being connected through flexible wire 82 (see Fig. 3) with the central terminal plate 66. It will now be apparent that when lever 46 swings in one direction (as shown in Fig. 4) so as to bring movable contact 80 into engagement with fixed contact 77 a circuit will be completed between the wires 71 and 72. When lever 46 is swung in the other direction so as to bring movable contact 80 into engagement with fixed contact 79, the first mentioned circuit will be broken but another circuit will be completed between wires 72 and 73. As will be hereinafter disclosed, when movable contact 80 engages fixed contact 77 the relay G will be caused to function to complete an operating circuit so that the exhausting mechanism will function to lower the pressure in the low pressure side of the system, thus increasing the pressure differential. The exhausting mechanism will continue to operate until movable contact 80 has engaged the other fixed contact 79, at which time the relay will function to stop the exhausting mechanism. By adjusting the positions of the contact screws 74 and 78, and thus increasing or decreasing the distance between contacts 77 and 79, the sensitiveness of the device may be controlled, that is the variations that are permitted from the predetermined pressure differential may be limited.

The relay G comprises a supporting member 83 secured against the rear wall 5 of casing A and carrying the main coil 84 of the relay. The pivoted armature member 85 carries a contact plate 86 which, when the coil 84 is energized, will be swung into engagement with a pair of fixed contact members 87 and 88 thus completing a main operating circuit. Also included in the relay unit are a pair of resistances 89 and 90, the functions of which will be hereinafter apparent. The wiring connections to relay G will be hereinafter disclosed in detail in connection with Fig. 6, but it may be here stated that the control wires 71, 72 and 73 already referred to extend from circuit breaker F to the relay unit G, and wires 91, 92 and 93 extend from the relay to the main cut-out switch H. The outgoing circuit wires 93', 94 and 95 through which the electrical controller is supplied with power and is connected with the mechanism to be controlled are enclosed in cable 96 which extends through an opening in the lower wall 2 of casing A, and are connected into the switch H.

In Fig. 6 is illustrated a wiring diagram for a system in which direct current is used to actuate the exhausting mechanism and the electrical controller. At 97 is indicated the motor which operates the exhausting mechanism, and 98 and 99 indicate the positive and negative power mains respectively. These power mains extend through the two arms of the main cut-out switch 100, and through fuses 101 and 102. At 103 is indicated a cut-out switch which must be closed or open to determine whether or not the electrical controller shall be placed in control of the exhausting motor 97. With switch 103 closed, whenever the relay G completes a circuit between the wires 94 and 95 an operating circuit for motor 97 will be completed as follows: From positive main 98 through motor 97, wire 104, one arm of switch 103, wire 94, switch H, wire 92, contacts 87, 86 and 88 of the relay, wire 93, switch H, wire 95, switch 103, and negative main 99. When this circuit is broken at the relay the motor 97 will stop. With switch 103 open, the motor 97 may be operated continuously by closing switch 105 which completes a circuit between wires 104 and 99 through wire 107, switch 105 and wire 106. At 108 is indicated a float-controlled switch adapted to separately energize the motor 97 at intervals when it is necessary to remove condensate from a collection receptacle. When switch 108 is closed, the motor energizing circuit is as follows: From positive main 98 through motor 97, wire 104, wire 109, switch 108, wire 110 to negative main 99.

The third wire 93' leading into cut-out switch H of the electrical controller and connecting with wire 91 extends directly from the positive main 98. Assuming now that the pressure differential has decreased so as to cause the movable contact 80 of circuit breaker F to move into engagement with fixed contact 77, a control circuit for energizing the relay coil 84 will be completed as follows: From positive wire 91 through wire 111, relay coil 84, wire 112, wire 72, wire 82, movable contact 80, fixed contact 77, wire 71, wire 113, fixed relay contact 88, and thence to negative main 93. The relay coil 84 will now be energized to cause the contact plate 86 to be moved into engagement with fixed contacts 87 and 88 and complete the circuit for actuating motor 97, as already described. A second "holding" circuit for energizing the coil 84 will also now be completed as follows: From positive main 91 through wire 111, coil 84, wire 112, wire 114, resistance 89, wire 115, relay contacts 87, 86 and 88, and negative main 93. This last circuit will remain closed even after the movable contact 80 has swung out of engagement with fixed contact 77 so as to break the first mentioned energizing circuit. When the movable contact 80 swings into engagement with fixed contact 79 (which will occur when the maximum pressure differential has been established) a shunt circuit for deenergizing the coil 84 will be completed as follows: From wire 91 through wire 116, resistance 90, wire 117, wire 73, fixed contact 79, movable contact 80, wire 82, wire 72, wire 114, resistance 89, wire 115, relay contacts 87, 86 and 88, and negative main 93. This shunt circuit will deenergize the coil 84 so as to permit the bridging contact 86 to swing out of engagement with fixed contacts 87 and 88 thus breaking the last mentioned operating circuits as well as the main actuating circuit for motor 97. The motor will now remain deenergized until movable contact 80 has again swung toward the left into engagement with fixed contact 77 whereupon the motor will again be started and will remain in operation until movable contact 80 has again engaged with fixed contact 79.

By suitably connecting up the wires 93', 94 and 95 leading to the controller, this device can be operated either from a direct current system as here shown, or from an alternating current system.

It will now be seen that as long as the desired pressure differential is established, the operating lever 46 will remain in a neutral vertical position with the circuit breaker contact 80 out of engagement with either of the fixed contacts 77 and 79, the difference in the pressure forces exerted on the two bellows diaphragms being just balanced by the adjustable spring device E. Any drop in this pressure differential will cause the movable contact 80 to be swung into engagement with the fixed contact 77, only sufficient pressure force being required to move the stem 39 and swing the lever 46. By adjusting the screws 74 and 78 the distance the movable contact 80 must move in order to engage one or the other of these contacts can be varied as desired so that the instrument may be made quite sensitive, that is the least possible variation from the desired pressure differential may be sufficient to complete one or the other of the operating circuits through the circuit breaker F and thus cause an operation of the relay G. By simply adjusting the compression of the spring 51, the pressure differential to be maintained can be determined, and by adjusting the positioning of screws 74 and 78 the sensitiveness of the instrument may be determined, that is the variations that are permissible from this predetermined differential. No other adjustments are necessary. It will be noted that the pressure operated units B and C are entirely closed, that is there are no joints to be sealed about moving parts, and the pressure chambers are self-draining so that there will be no hydrostatic heads of liquid to accumulate and influence the fluid pressures exerted on the two diaphragms.

In the modification shown in Fig. 5, the pressure-operated portion of the system comprising the units B and C may be the same as already described. The operating lever 46' is modified by forming the lower end thereof with a bracket 118 in opposite arms of which are mounted the adjustable screws 119 and 120. The spring-balancing device E operates as before against a bracket arm 121 of lever 46'. At J is indicated a circuit-maker and breaker of the vacuum contact type. This comprises a vacuum tube in which are sealed the contact elements 123 and 124 with which the main circuit wires 94 and 95 are connected. In the upper portion of the tube is sealed a downwardly projecting stem member 125 which carries a contact member 126 projecting between the contacts 123 and 124. A stem 127 projects upwardly from the tube between the adjustable screws 119 and 120. The upper end portion of the tube is sufficiently flexible to permit the stem structures 125 and 127 to be tilted in one direction or the other when engaged by the screws 119 and 120 so as to cause the electrical connection between contacts 123, 126 and 124 to be made or broken. Very little power is required to operate this device. As in the form first described, the sensitiveness of the instrument may be adjusted by properly positioning the screws 119 and 120.

I claim:

1. In an electrical controller, a pair of opposed pressure-actuated devices, each device comprising a housing having one open end, and a bellows diaphragm positioned within the housing and having one closed end and one open end, the open end of the diaphragm being connected with the open end of the housing to form a closed chamber within the housing and about the diaphragm, means for admitting fluids under pressure to each of the chambers, one chamber being under higher pressure than the other chamber, a stem mounted between the two housings and within the bellows diaphragms and having its ends abutting the closed ends of the two bellows respectively, a movable member connected with and actuated by the stem, an adjustable spring device fixedly mounted at one end and abutting at the other end against the movable member to balance the normal difference in pressure exerted on the two diaphragms, and a circuit controller actuated by movements of the movable member.

2. In an electrical controller, a pair of opposed pressure-actuated devices, each device comprising a housing having one open end, and a bellows diaphragm positioned within the housing and having one closed end and one open end, the open end of the diaphragm being connected with the open end of the housing to form a closed chamber within the housing and about the diaphragm, means for admitting fluids under pressure to each of the chambers, one chamber being under higher pressure than the other chamber, a stem mounted between the two housings and within the bellows diaphragms and having its ends abutting the closed ends of the two bellows respectively, stops for limiting the movements of the stem and bellows in either direction, a movable member connected with and actuated by the stem, an adjustable spring device fixedly mounted at one end and abutting at the other end against the movable member to balance the normal difference in pressure exerted on the two diaphragms, and a circuit controller actuated by movements of the movable member.

3. In an electrical controller, a pair of opposed pressure-actuated devices, each device comprising a housing having one open end, and a bellows diaphragm positioned within the housing and having one closed end and one open end, the open end of the diaphragm being connected with the open end of the housing to form a closed chamber within the housing and about the diaphragm, means for admitting fluids under pressure to each of the chambers, one chamber being under higher pressure than the other chamber, a stem mounted between the two housings and within the bellows diaphragms and having its ends abutting the closed ends of the two bellows respectively, a movable member connected with and actuated by the stem, an adjustable spring device fixedly mounted at one end and abutting at the other end against the movable member to balance the normal difference in pressure exerted on the two diaphragms, a movable contact carried by the movable member, and a pair of adjustably fixed contacts positioned to be alternatively engaged by the movable contact.

4. In an electrical controller, a pair of opposed pressure-actuated devices, each device comprising a housing having one open end, and a bellows diaphragm positioned within the housing and having one closed end and one open end, the open end of the diaphragm being connected with the open end of the housing to form a closed chamber within the housing and about the diaphragm, means for admitting fluids under pressure to each of the chambers, one chamber being under higher pressure than the other chamber, a stem mounted between the two housings and within the bellows diaphragms and having its ends abutting the closed ends of the two bellows respectively, a spacing member mounted between the two housings, a lever fulcrumed in the spacing member and pivotally connected with the stem, an adjustable spring device fixedly mounted at one end and engaging the lever at the other end to balance the normal difference in pressure exerted on the two diaphragms, and a circuit controller including a member actuated by the lever.

5. In an electrical controller, a pair of opposed pressure-actuated devices, each device comprising a housing having one open end, and a bellows diaphragm positioned within the housing and having one closed end and one open end, the open end of the diaphragm being connected with the open end of the housing to form a closed chamber within the housing and about the diaphragm, means for admitting fluids under pressure to each of the chambers, one chamber being under higher pressure than the other chamber, a stem mounted between the two housings and within the bellows diaphragms and having its ends abutting the closed ends of the two bellows respectively, a spacing member mounted between the two housings, a lever fulcrumed in the spacing member and pivotally connected with the stem, an adjustable spring device fixedly mounted at one end and engaging the lever at the other end to balance the normal difference in pressure exerted on the two diaphragms, a movable contact carried by the lever, and a pair of adjustably fixed contacts positioned to be alternatively engaged by the movable contact.

6. In an electrical controller, a pair of opposed pressure-actuated devices, each device comprising a housing having one open end, and a flexible diaphragm within the housing and closing the open end thereof, a circuit breaker, means interposed between the two diaphragms and actuated by movements of the diaphragms to actuate the circuit breaker, there being a well formed in the bottom of each housing to collect condensate, and downwardly extending pipe connections communicating with the respective wells to transmit fluids under pressure to the housings and to drain out condensate collecting in the wells.

7. In an electrical controller, a pair of opposed pressure-actuated devices, each device comprising a substantially horizontally extending housing closed at one end and open at the other end and formed with a well in the bottom thereof for collecting condensate, and a bellows diaphragm positioned within the housing and closing the open end thereof, a circuit-breaker, means interposed between the two diaphragms and actuated by movements of the diaphragms to actuate the circuit-breaker, and downwardly extending pipe connections communicating with the respective wells to transmit fluids under pressure to the housings and to drain out condensate collecting in the wells.

8. In an electrical controller, a pressure-operated mechanism comprising a pair of similar housings each having one open end, the open ends being opposed to one another, a pair of similar bellows diaphragms positioned one in each housing, each diaphragm being closed at one end and having an outwardly projecting annular flange at the other end, a spacing member positioned between the housings and comprising a pair of annular members secured to the open ends of the housings, the flanges of the diaphragms being clamped between the annular members and the housings so as to seal a pair of pressure chambers, one within each housing and about each diaphragm, means for admitting fluids under pressure to the two chambers one chamber being under higher pressure than the other, a stem positioned within and between the two diaphragms and abutting at its ends against the closed ends of the respective diaphragms, there being guide brackets formed in the spacing member through which intermediate portions of the stem are slidably mounted, a lever intermediately fulcrumed in the spacing member, one arm of the lever being pivotally connected with an intermediate portion of the stem, a spring for balancing the normal difference in pressure exerted on the two diaphragms, an abutment member interposed between one end of the spring and a portion of the lever, a bracket extending from one of the housings, an adjustable abutment means interposed between the bracket and the other end of the spring, and a circuit-controller having a movable member actuated by the lever.

9. In an electrical controller, a pressure-operated mechanism comprising a pair of similar housings each having one open end, the open ends being opposed to one another, a pair of similar bellows diaphragms positioned one in each housing, each diaphragm being closed at one end and having an outwardly projecting annular flange at the other end, a spacing member positioned between the housings and comprising a pair of annular members secured to the open ends of the housings, the flanges of the diaphragms being clamped between the annular members and the housings so as to seal a pair of pressure chambers, one within each housing and about each diaphragm, means for admitting fluids under pressure to the two chambers one chamber being under higher pressure than the other, a stem positioned within and between the two diaphragms and abutting at its ends against the closed ends of the respective diaphragms, there being guide brackets formed in the spacing member through which intermediate portions of the stem are slidably mounted, a lever intermediately fulcrumed in the spacing member, one arm of the lever being pivotally connected with an intermediate portion of the stem, a spring for balancing the normal difference in pressure exerted on the two diaphragms, an abutment member interposed between one end of the spring and a portion of the lever, a bracket extending from one of the housings, an adjustable abutment means interposed between the bracket and the other end of the spring, and a circuit-breaker comprising a contact carried by the lever and a pair of adjustably mounted fixed contacts positioned to be alternatively engaged by the movable contact.

ELLIS G. POWELL.